United States Patent [19]
Hockaday et al.

[11] Patent Number: 5,101,664
[45] Date of Patent: Apr. 7, 1992

[54] OPTICAL PRESSURE TRANSDUCER

[75] Inventors: Bruce D. Hockaday, Vernon; James P. Waters, Ellington, both of Conn.

[73] Assignee: United Technologies Corporation, Hartford, Conn.

[21] Appl. No.: 597,141

[22] Filed: Oct. 15, 1990

[51] Int. Cl.⁵ .......................... G01L 7/08; G01L 11/00
[52] U.S. Cl. ...................................... 73/704; 73/705; 73/708; 73/778; 73/862.59; 250/231.19
[58] Field of Search ................. 73/702, 704, 705, 778, 73/862.59, DIG. 1, 708; 250/231.19

[56] References Cited

U.S. PATENT DOCUMENTS

| | | | |
|---|---|---|---|
| 4,229,979 | 10/1980 | Greenwood | 73/704 |
| 4,813,271 | 3/1989 | Greenwood | 73/702 |
| 4,841,775 | 6/1989 | Ikeda et al. | 73/704 |
| 4,930,042 | 5/1990 | Wiegond et al. | 361/280 |
| 5,009,108 | 4/1991 | Harada et al. | 73/704 |

OTHER PUBLICATIONS

App. Phys. Lett. 38, 15 Jun. 1981, "Laser Chemical Technique for Rapid Direct Writing of Surface Relief in Silicon", Ehrlich et al.
Electronics Letters, vol. 23, No. 25, Dec. 3, 1987, "Optically Excited Resonant Beam Pressure Sensor".
Electronics Letters, vol. 24, No. 10, May 12, 1988, "Novel Optically Excited Resonant Pressure Sensor".
UV Laser Surface Interactions, "Interaction of Deep-Ultraviolet Laser Light with GaAs Surfaces in Aqueous Solutions", Podlesnik et al., 1986.

Primary Examiner—Donald O. Woodiel

[57] ABSTRACT

A micromachined silicon pressure transducer employs a vibrating bridge that is formed from the same silicon slab as the pressure responsive diaphragm. The resonant frequency of the bridge is a temperature insensitive representation of the pressure.

12 Claims, 4 Drawing Sheets

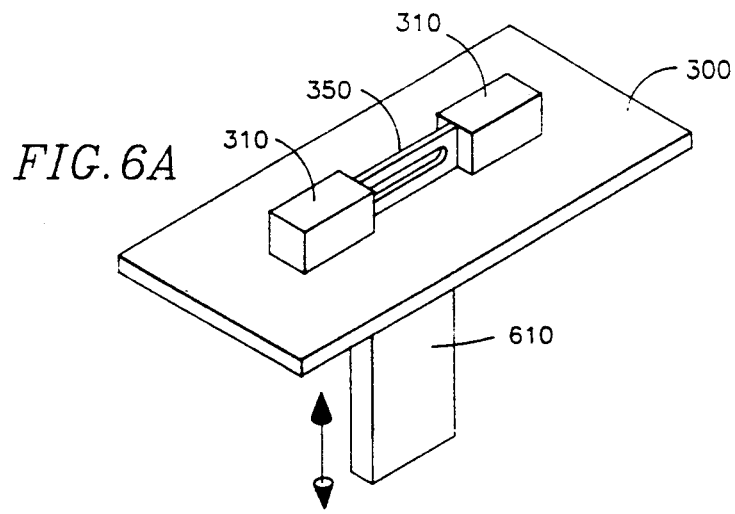
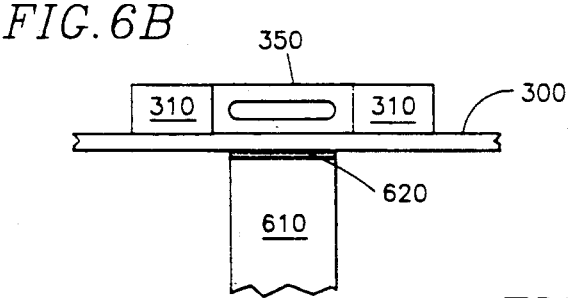
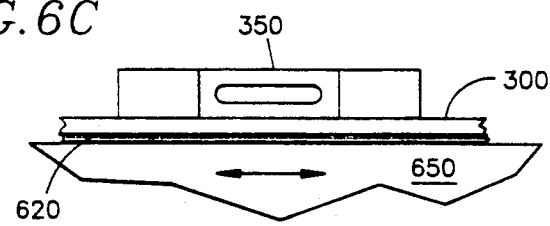
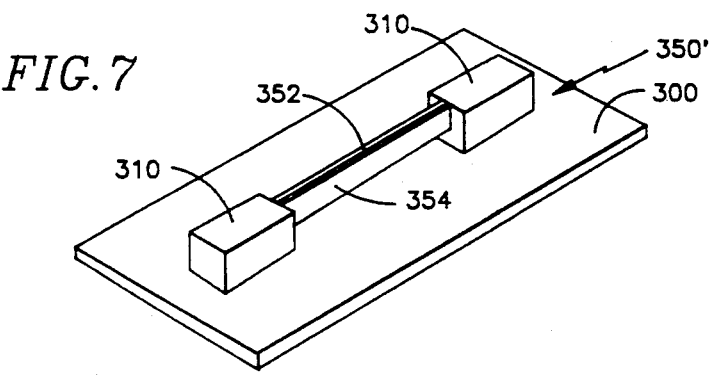

OPTICAL PRESSURE TRANSDUCER

CROSS REFERENCE TO RELATED APPLICATIONS

This application is related to the subject matter disclosed and claimed in copending U.S. Ser. No. 597,142 entitled Silicon Etching Technique by Bruce D. Hockaday and James P. Waters filed on even date herewith and assigned to the same assignee herein incorporated by reference.

TECHNICAL FIELD

The field of the invention is that of a pressure transducer, micromachined from silicon, having sensing elements that are entirely optical.

BACKGROUND ART

It is known to make pressure sensors by micromachining silicon wafers to form a diaphragm and a responsive element. U.S. Pat. No. 4,930,042, for example, illustrates a pressure sensor having an electrical readout in which the capacitance of the sensing volume is measured as a function of pressure.

It is also known to fabricate a vibrating, optically driven element from highly doped silicon, using the doping as an etch stop, such as the technique disclosed in "Novel Optically Excited Resonant Pressure Sensor", Electronics Letters, May 12, 1988 Vol. 24, No. 10, page 573, but such devices have a significant temperature dependence caused by the dissimilar doping that presents great difficulty when they are used over a broad temperature range.

The art has sought a pressure sensor that is capable of operating at high and low temperature extremes and therefore is insensitive to temperature variations. There is a problem in that the element of the diaphragm which is sensitive to the pressure will usually have also a temperature dependence. Further, the use of dissimilar materials within the device will inherently exert a strain based on differential thermal expansion that is confused with the variations due to pressure.

The art has long sought a rugged pressure sensor capable of operating at high and low temperatures and having a reduced sensitivity to temperature variations.

DISCLOSURE OF INVENTION

The invention relates to an improved pressure sensor in which a bridge comprising a slab of silicon is rigidly attached to a diaphragm that flexes as a function of pressure. The bridge and the diaphragm are micromachined from the same silicon wafer having a uniform concentration of dopants, so that the coefficient of thermal expansion of both of them is exactly the same. The bridge is driven with a sinusoidal or pulsed optical signal and the vibration frequency of the bridge is measured using interferometric techniques. The bridge is driven at its resonant frequency, which depends on the pressure applied to the diaphragm and only very weakly depends on the temperature of the diaphragm.

Other features and advantages will be apparent from the specification and claims and from the accompanying drawings which illustrate an embodiment of the invention.

BRIEF DESCRIPTION OF DRAWINGS

FIGS. 6A, 6B, 6C, and 6D illustrate an embodiment of the invention used as a strain gauge.

FIG. 7 illustrates an embodiment of the invention used as a temperature sensor.

BEST MODE FOR CARRYING OUT THE INVENTION

Figure 5:
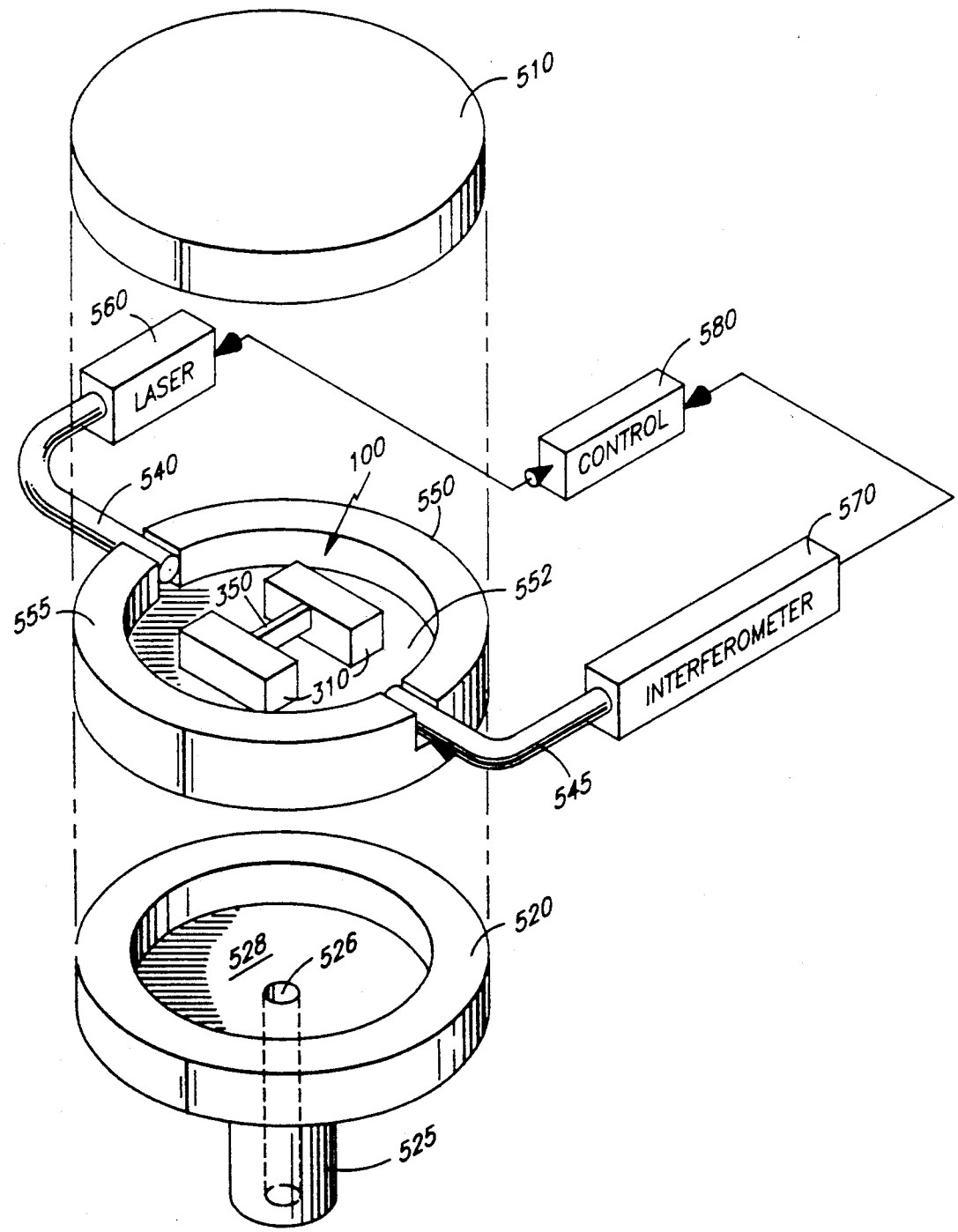
FIG. 5 illustrates an exploded view of another embodiment of the invention.

Referring now to FIG. 5, there is shown in exploded view an embodiment of the invention. Tube 525, a pressure port, communicates with whatever gas or liquid pressure it is desired to measure. The pressure flows through channel 526 into volume 528 within header 520, which is micromachined from silicon using conventional techniques. Header 520 is bonded to the structure shown in the middle of the drawing, which will be described later and is denoted generally by the numeral 550. This structure contains a diaphragm referred to by the numeral 552 and a bridge structure denoted generally by the numeral 100. A cap 510 is bonded to structure 550 using the same technique as that used for bonding element 520 to 550. This technique may illustratively be that disclosed in U.S. Pat. No. 4,930,042. The space within which structure 100 is formed may be in a vacuum in order to provide an absolute measurement of pressure or may contain a gas at a standard pressure of 1 atmosphere. A gas damps the vibration in a temperature dependent manner, so the vacuum is preferred. Header 520 may be replaced by a mechanical linkage to apply a mechanical force denoting an extension of length or any other physical parameter that can be translated into the application of force to diaphragm 552. This invention relates generally to measuring the strain on diaphragm 552 and in particular to measuring of pressure which causes that strain.

Figure 1:
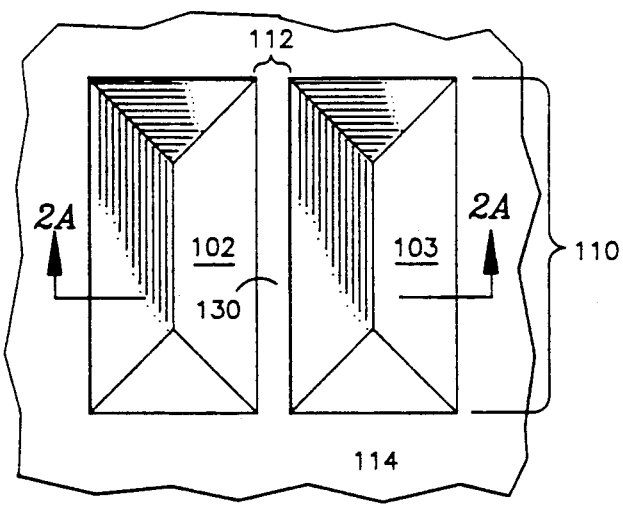
FIG. 1 illustrates a plan view of one embodiment of the invention.

Referring now to FIG. 1 there is shown in plan view a simplified embodiment of the invention fabricated from <100> cut silicon. At the center of the Figure, there is a bridge 130 which is a piece of silicon having a length of 180 microns, width 20 microns and depth perpendicular to the paper of six microns. This bridge is formed above a well or trench denoted by the numerals 102 and 103, on the left and right side, respectively. Cross sections are shown in FIG. 2A-2C along the lines 2A—2A in the Figure.

Figure 2A:
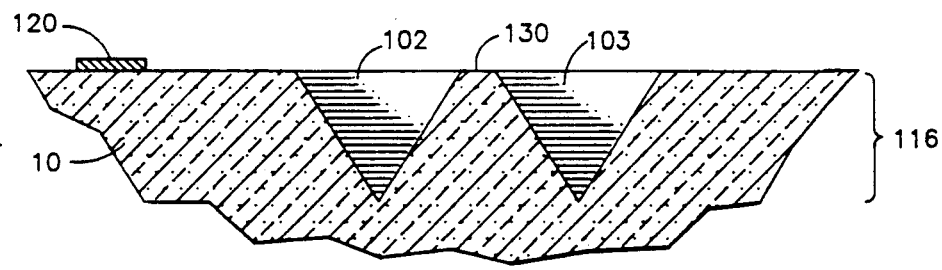
FIG. 2A and 2B illustrates cross sections of the embodiment of FIG. 1.

Referring now to FIG. 2A, there is shown a cross section through lines 2A—2A showing the two wells or V-grooves 102 and 103 that have been formed by a standard anisotropic etching technique, such as plasma etching or wet etching, to a depth denoted by the bracket 116, illustratively 80 microns in this version. The characteristic angle of 57° of the grooves is the result of the silicon crystal structure.

The silicon wafer 10, shown in cross-section, is the diaphragm of the pressure sensor and has an illustrative thickness of 200 microns. It is necessary to undercut bridge 130 in order to free it up so that it may vibrate.

Figure 2B:
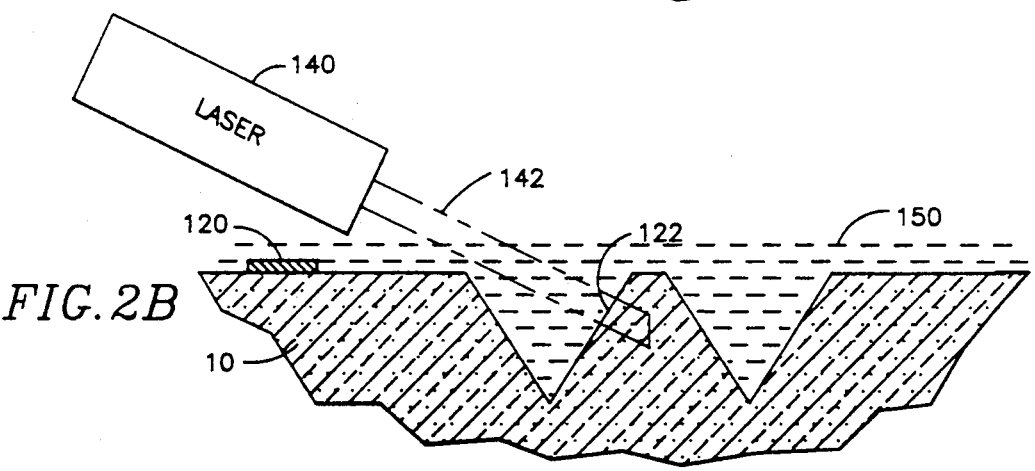
Figure 2C:
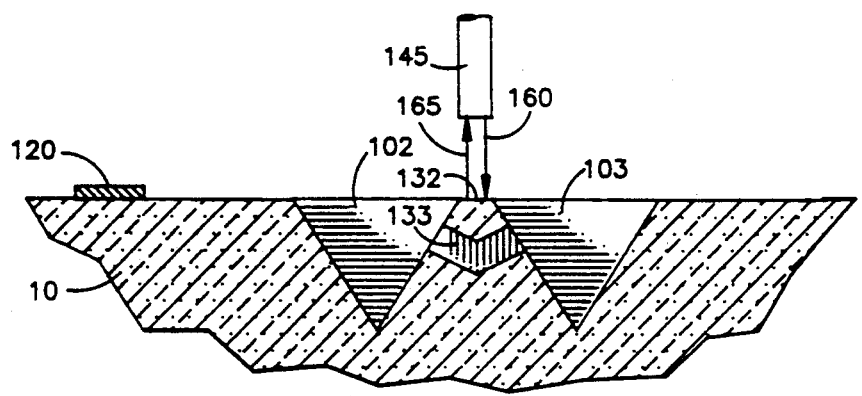

This is done by a process illustrated schematically in FIG. 2B, in which laser 140 directs a beam denoted by the numeral 142 at the side wall of trench 102. This beam may be a slit beam covering the entire length of bridge 130, it may, alternatively, by a pencil beam that is swept along the length of bridge 130 by rotating a mirror, moving the wafer or any other convenient technique. Illustratively, strip 132 was undercut from both sides by rotating the wafer by 180°, but those skilled in the art may use other techniques such as splitting the beam and using mirrors to illuminate both sides at once.

The wafer is immersed in a fluid denoted generally by the speckling and the numeral 150 which is a wet-etch fluid comprising dilute hydrofluoric acid in water, at a concentration of 10%-20% by volume, with 15% preferred. It has been found that the laser enhances the activity of the etchant at the spot where the beam hits. The mechanism is believed to be that a laser beam having a wavelength in the visible or ultraviolet frees electron-hole pairs within the silicon and thereby induces the process of anodic etching that is in use. The wavelength range can be from visible light that has enough photon energy to generate the photoelectric effect down into ultraviolet wavelengths that will penetrate through a reasonable amount of the etchant. Electrodes used in the anodic etching process are a first electrode 122 shown formed by the laser spot, which promotes free electron-hole pairs and a second electrode 120, illustratively a gold electrode forming an ohmic contact between silicon substrate 10 and the acid. An ohmic contact is preferable to merely contacting the wafer with the etchant because such a contact forms a Schottky diode that is not as effective in promoting the enhanced etching and the etch rate is considerably higher with the ohmic contact.

With the aid of this improved etching technique, it has been found that the bridge can be undercut. Bridge 130 has an illustrative width of 20 microns, cut by a laser spot having a diameter of 35 microns. In the prior art etching techniques it would be impossible or extremely difficult to undercut to this width. If it were possible, the bridge would have to be made considerably oversized, because the etching fluid would attack the bridge as well. The bridge width and thickness could not be reliably controlled. With this etching technique, a dilute etching fluid that does not attack the bridge silicon in the absence of the laser spot enables the preservation of a clean edge suitable for predictable frequency control to bridge 130. The widths of at least one of the wells 102 and 103 will be made of an appropriate size so that the light can strike bridge 132 at an angle such that a slot 133 nearly parallel to the plane of wafer 10 is achieved.

Referring now to FIG. 2C, there is shown schematically a measurement process applied to the bridge. A source of light which may be an optical fiber 145 directs a first beam of light 160 at a first wavelength on to the top of bridge 132. This beam 160 is pulsed at a frequency equal to the nominal vibration frequency of the bridge. The actual displacement of the bridge up and down with respect to surface is measured by a second beam of light denoted by the numeral 165 at a second wavelength. This light strikes the top of bridge 132 and a portion of it is deflected back into the fiber 145. Those skilled in the art will readily be able to devise other optical arrangements, including lenses for collecting a higher magnitude return signal.

The return beam 165 passes along fiber 145 to an interferometer of conventional type, such as Michelson, in which the phase of returning beam 165 is compared with a reference beam of the same wavelength that was split off before the beam was directed at the bridge. With this phase difference as a function of time, the actual displacement of the bridge is measured. The repetition rate of beam 160 is then varied to seek out the resonant frequency of bridge 132 using a conventional phase locking or other algorithm for seeking a phase difference of 90° between the driving signal of beam 160 and the displacement signal measured by beam 165. A controller 580, which may include a general purpose computer and associated conventional phase measurement circuits, is shown receiving a signal from interferometer 570 and both directing repetition rate control signals to laser 560 and receiving from it a phase signal for the comparison. Such maximizing algorithms are well known, such as illustrated in Phaselock Techniques by Gardner and may be readily implemented by those skilled in the art in a number of ways.

Figure 3:
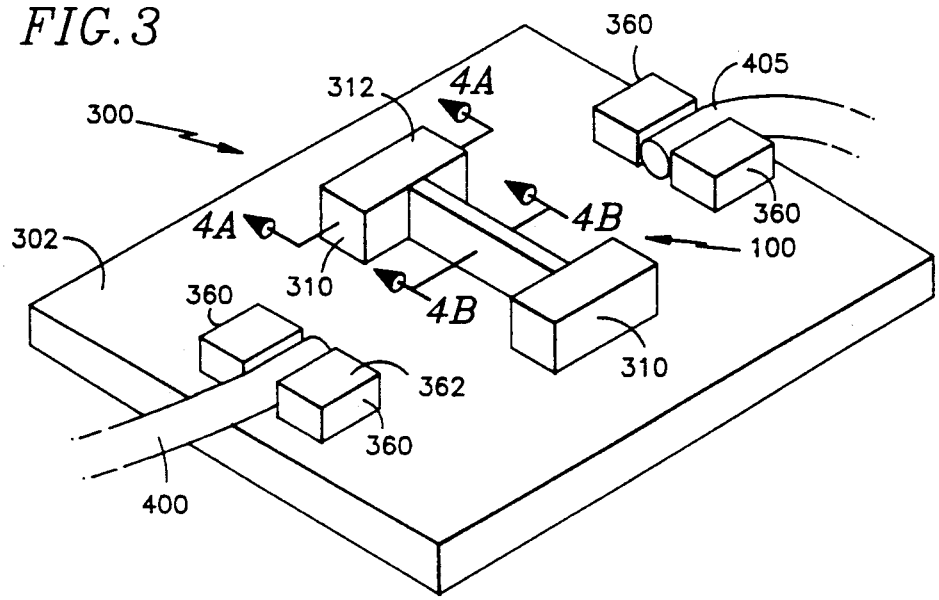
FIG. 3 illustrates a perspective view of another embodiment of the invention.

Referring now to FIG. 3, there is shown in perspective an improved embodiment of the invention that eliminates the wells 102 and 103 by fabricating the device structure from <110> cut silicon. A high concentration of KOH solution can also be used with <100> silicon to produce similar vertical walls. There is shown a silicon slab denoted generally by the numeral 300 and having a top surface 302. This slab has been etched below the general surface of the wafer by a conventional anisotropic etching technique, giving rise to a substantially planar surface because of the different orientation of the crystal axes with respect to the surface. Blocks 360 are formed in order to hold optical fibers 400 and 405, respectively, which perform the two functions of driving bridge 350 and of measuring the displacement of the bridge. Bridge 350 is formed between supporting blocks 310 by a process that is illustrated in FIG. 4. Blocks 360 have a top surface 362 and blocks 310 have a top surface 312. Illustratively, surfaces 362 and 312 are slightly below the original top surface of the silicon wafer so that they may function as an overpressure stop.

Figure 4A:
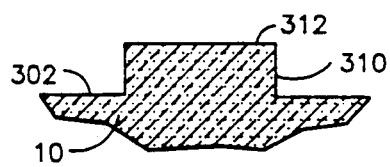
FIGS. 4A, 4B and 4C illustrate cross sections of the embodiment of FIG. 3.
Figure 4B:
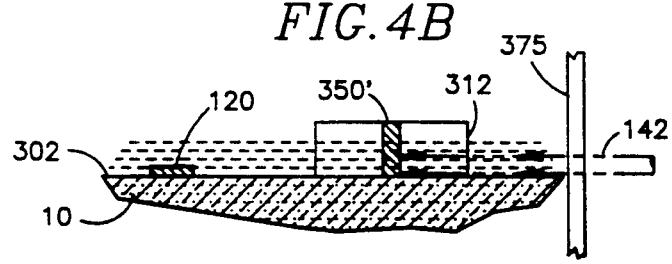

Referring now to FIG. 4A, there is shown a cross-section along lines 4A—4A showing surface 302 of the mesa and 312 of block 310. This block 310 has been etched out of a thicker portion of the diaphragm by either wet or dry anisotropic etching as described above. In FIG. 4B, there is shown along lines 4B—4B a vertical wall 350' extending perpendicular to the paper which will form bridge 350 of FIG. 3. A similar beam 142 is shown performing the same undercutting etching process as that illustrated in FIG. 2B, passing through quartz window 375. It will be evident that this embodiment has the advantage of eliminating the need for the wells 102 and 103 since the blocks 310 and the bridge 350 are above the general surface. Thus, the laser can strike and penetrate at a more convenient angle.

Figure 4C:
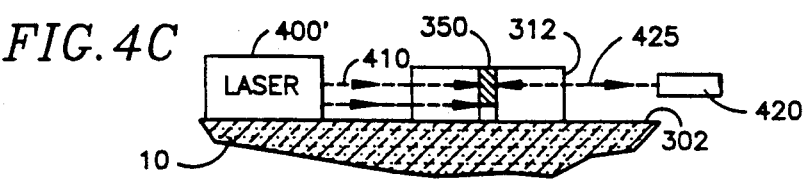

Referring now to FIG. 4C, there is shown along lines 4B—4B the bridge in operation through the same cross section as that of FIG. 4B, in which laser 400' generates driving beam 410 that pulses bridge 350 as before. Fiber 420, shown schematically on the righthand side, carries beam 425 and the reflection. Referring now to FIG. 5, there is shown the embodiment of FIG. 3 together with the remainder of the structure. Laser 560 generates the beam through optical fiber 540 that replaces beam 410 in FIG. 4C. Similarly, interferometer 570 is a generic block referring to a source of radiation that travels down fiber 545 and back, together with a fiber loop for the comparison delay. Rim 550 replaces blocks 360 in holding the fiber and also fibers 540 and 545 are set in epoxy, indium solder, glass, or any other bonding technique appropriate to the temperature at which the device will operate, that forms a gas-tight seal around the fibers. Cap 510 completes the enclosure of the sensor unit. A typical diaphragm thickness is 150 microns, typical diaphragm diameter is 6 mm, and a typical resonant frequency is 750 KHz, for a pressure range of 100 psi at a temperature of 70°–1000° R.

The invention has been described in the context of a pressure measurement, but the device is inherently a strain sensor, the strain being provided by a flexible diaphragm. The same principles can be applied to make a strain sensor or a thermometer. Referring now to FIG. 6A, there is shown in perspective a portion of a strain gauge constructed according to the invention. Slab 300' corresponds to diaphragm 300 of FIG. 3, but it is no longer necessary that the slab be continuous to contain the gas pressure. It may be mounted in any convenient fashion similar to that of FIG. 5. Preferably, the mounting is not gas tight, because variations in pressure would have to be compensated in order to make an accurate strain measurement. Shaft 610 is bonded to the bottom of slab 300' by any convenient bonding layer 620, such as the glass bonding technique disclosed in the above-referenced patent. Shaft 610 moves in response to some mechanical motion, which may come from anything that it is desired to measure. Those skilled in the transducer art are aware of many ways to convert a physical quantity such as temperature, tensile force, vibration, etc. to a mechanical displacement. The strain may be parallel to the plane of slab 300, as shown if FIG. 6C, in which substrate 300 is bonded by any convenient method to sample 650. The bonding agent, which may be glass frit, epoxy, or any other medium having a coefficient of expansion reasonably well matched to silicon in the temperature range of interest, is shown as layer 620. If sample 650 is aluminum or another material that adheres to silicon, then layer 620 may be dispensed with.

Referring now to FIG. 7, there is shown an embodiment of the invention suited for temperature measurement, in which substrate 300 and blocks 310 are made as before, but beam 350' is made from a silicon member 352 with a deposited layer 354 having a different coefficient of thermal expansion, such as chrome applied by electron beam evaporation, in which the material is evaporated by heating by bombardment with an electron beam and the silicon bridge is used as a shadow mask, so that the dissimilar material can deposit on two surfaces of member 352 (the exposed side and the top), making a bimetallic-like bridge structure. Alternatively, a temperature sensor can be made from a silicon structure bonded to a dissimilar material as shown in FIG. 6C, where material 650 would be aluminum or some other material that bonds to silicon.

It should be understood that the invention is not limited to the particular embodiments shown and described herein, but that various changes and modifications may be made without departing from the spirit and scope of this novel concept as defined by the following claims.

We claim:

1. A pressure transducer having a test chamber and a flexible diaphragm forming one end thereof, said diaphragm having an inner surface facing said test chamber and an outer surface opposite said inner surface, whereby said diaphragm exhibits a strain dependent on pressure within said test chamber, and a responsive element attached to said outer surface for generating a response dependent on said strain, and means for detecting said response, characterized in that:

said responsive element and said flexible diaphragm are micromachined from the same piece of uniformly doped silicon, whereby both said diaphragm and said responsive element have the same temperature coefficient of thermal expansion;

said responsive element is a beam having a resonant frequency of vibration and being rigidly attached to said diaphragm at two ends thereof; and said response dependent on said strain is said resonant frequency of vibration of said beam.

2. A pressure transducer according to claim 1, further characterized in that said means for detecting said response comprises means for applying optical pulses to said beam at a controllable frequency;

frequency measurement means for measuring the frequency of vibration of said strip; and comparison means connected to said frequency measurement means for measuring said resonant frequency.

3. A pressure transducer according to claim 1, further characterized in that said means for detecting said response comprises means for applying a train of optical pulses to said beam at a controllable frequency and means for detecting the phase of said optical pulse train;

means for detecting a beam vibration signal and the phase of said beam vibration signal; and means for comparing said phase of said optical pulse train with said phase of said beam vibration signal and adjusting said frequency of said optical pulse train until said phase of said optical pulse train and said phase of said beam vibration signal have a predetermined relationship.

4. A pressure transducer according to claim 3, further characterized in that said means for detecting said response includes control means, responsive to said means for detecting said beam vibration signal, for varying said controllable frequency until said controllable frequency equals said resonant frequency of vibration.

5. A pressure transducer according to claim 1, further characterized in that:

said responsive element comprises a beam having a beam length and being rigidly attached to a substrate by mounting means, said beam, said mounting means and said substrate being formed from the same piece of silicon;

said beam having a top surface substantially coplanar with a neighboring top surface of said substrate and being separated from said substrate along two sides and a lower surface of said beam length, whereby said beam is free to vibrate at said resonant frequency of vibration.

6. A pressure transducer according to claim 1, further characterized in that:

said responsive element comprises a beam having a beam length and being rigidly attached to a substrate by mounting means, said beam, said mounting means and said substrate being formed from the same piece of silicon;

said beam having a top surface substantially coplanar with a neighboring top surface of said mounting means and being disposed above said substrate by a predetermined distance between a neighboring portion of said substrate surface and a lower surface of said beam, whereby said beam is free to vibrate at said resonant frequency of vibration.

7. A strain transducer having a flexible mounting member forming one end thereof, said mounting member having a first surface and a second surface opposite said first surface, whereby said mounting member exhibits a strain dependent on force exerted on said first surface by said mounting member, and a responsive element attached to said second surface for generating a response dependent on said strain, and means for detecting said response, characterized in that:

said responsive element and said flexible maunting member are micromachined from the same piece of uniformly doped silicon, whereby both said mounting member and said responsive element have the same temperature coefficient of thermal expansion;

said responsive element is a beam having a resonant frequency of vibration and being rigidly attached to said mounting member at two ends thereof; and said response dependent on said strain is said resonant frequency of vibration of said beam.

8. A strain transducer according to claim 7, further characterized in that said means for detecting said response comprises means for applying optical pulses to said beam at a controllable frequency;

frequency measurement means for measuring the frequency of vibration of said strip; and comparison means connected to said frequency measurement means for measuring said resonant frequency.

9. A strain transducer according to claim 7, further characterized in that said means for detecting said response comprises means for applying a train of optical pulses to said beam at a controllable frequency and means for detecting the phase of said optical pulse train;

means for detecting a beam vibration signal and the phase of said beam vibration signal; and means for comparing said phase of said optical pulse train with said phase of said beam vibration signal and adjusting said frequency of said optical pulse train until said phase of said optical pulse train and said phase of said beam vibration signal have a predetermined relationship.

10. A strain transducer according to claim 9, further characterized in that said means for detecting said response includes control means, responsive to said means for detecting said beam vibration signal, for varying said controllable frequency until said controllable frequency equals said resonant frequency of vibration.

11. A strain transducer according to claim 7, further characterized in that:

said responsive element comprises a beam having a beam length and being rigidly attached to a substrate by mounting means, said beam, said mounting means and said substrate being formed from the same piece of silicon;

said beam having a top surface substantially coplanar with a neighboring top surface of said substrate and being separated from said substrate along two sides and a lower surface of said beam length, whereby said beam is free to vibrate at said resonant frequency of vibration.

12. A strain transducer according to claim 7, further characterized in that:

said responsive element comprises a beam having a beam length and being rigidly attached to a substrate by mounting means, said beam, said mounting means and said substrate being formed from the same piece of silicon;

said beam having a top surface substantially coplanar with a neighboring top surface of said mounting means and being disposed above said substrate by a predetermined distance between a neighboring portion of said substrate surface and a lower surface of said beam, whereby said beam is free to vibrate at said resonant frequency of vibration.

* * * * *